(12) United States Patent
Lee et al.

(10) Patent No.: US 9,287,736 B2
(45) Date of Patent: Mar. 15, 2016

(54) WIRELESS POWER TRANSMITTER AND METHOD OF TRANSMITTING POWER THEREOF

(71) Applicants: LG INNOTEK CO., LTD., Seoul (KR); KOREA ELECTRO TECHNOLOGY RESEARCH INSTITUTE, Changwon-si, Gyeongsangnam-do (KR)

(72) Inventors: Ki Min Lee, Seoul (KR); Kwan Ho Kim, Seoul (KR); Jin Wook Kim, Seoul (KR); Young Jin Park, Seoul (KR); Hyeon Chang Son, Seoul (KR); Won Tae Lee, Seoul (KR)

(73) Assignees: LG INNOTEK CO., LTD., Seoul (KR); KOREA ELECTRO TECHNOLOGY RESEARCH INSTITUTE, Gyeongsangnam-Do (KR)

( * ) Notice: Subject to any disclaimer, the term of this patent is extended or adjusted under 35 U.S.C. 154(b) by 523 days.

(21) Appl. No.: 13/685,305

(22) Filed: Nov. 26, 2012

(65) Prior Publication Data
US 2013/0134794 A1    May 30, 2013

(30) Foreign Application Priority Data

Nov. 25, 2011 (KR) .......................... 10-2011-0124419

(51) Int. Cl.
*H01F 27/00* (2006.01)
*H02J 17/00* (2006.01)
*H02J 7/02* (2006.01)
*H04B 5/00* (2006.01)

(52) U.S. Cl.
CPC .................. *H02J 17/00* (2013.01); *H02J 7/025* (2013.01); *H04B 5/0037* (2013.01); *H04B 5/0081* (2013.01)

(58) Field of Classification Search
CPC ........................................................ H02J 5/005
USPC ........................................................... 307/104
See application file for complete search history.

(56) References Cited

U.S. PATENT DOCUMENTS

| 7,023,391 | B2 | 4/2006 | Wuidart et al. |
| 8,030,888 | B2 * | 10/2011 | Pandya et al. .................. 320/109 |
| 8,558,411 | B2 * | 10/2013 | Baarman et al. ............... 307/104 |

(Continued)

FOREIGN PATENT DOCUMENTS

| CN | 10-2048367 A | 5/2011 |
| KR | 10-2011-0019772 A | 2/2011 |

(Continued)

OTHER PUBLICATIONS

Office Action dated Dec. 21, 2012 in Korean Application No. 10-2011-0124419, filed Nov. 25, 2011.

(Continued)

*Primary Examiner* — Stephen W Jackson
(74) *Attorney, Agent, or Firm* — Saliwanchik, Lloyd & Eisenschenk

(57) ABSTRACT

Disclosed are a wireless power transmitter and a method of transmitting power thereof. The wireless power transmitter to wirelessly transmit power to a wireless power receiver includes a transmission coil to receive power from a power supply apparatus, and a transmission resonance unit to transmit the power received therein from the transmission coil to the wireless power receiver using resonance. The transmission resonance unit includes an inner loop, and an outer loop connected to the inner loop while surrounding the inner loop.

16 Claims, 8 Drawing Sheets

(56) References Cited

U.S. PATENT DOCUMENTS

| | | | |
|---|---|---|---|
| 8,829,734 B2 * | 9/2014 | Gulak et al. | 307/104 |
| 8,934,857 B2 * | 1/2015 | Low et al. | 455/129 |
| 2004/0235516 A1 | 11/2004 | Otsuki et al. | |
| 2010/0117454 A1 | 5/2010 | Cook et al. | |
| 2010/0259217 A1 | 10/2010 | Baarman et al. | |
| 2010/0308939 A1 | 12/2010 | Kurs | |
| 2011/0133569 A1 | 6/2011 | Cheon et al. | |

FOREIGN PATENT DOCUMENTS

| | | | |
|---|---|---|---|
| KR | 10-2011-0062841 A | 6/2011 | |
| TW | 588006 B | 5/2004 | |
| WO | WO-2008/035248 A2 | 3/2008 | |
| WO | WO-2010/009429 A1 | 1/2010 | |

OTHER PUBLICATIONS

European Search Report dated Jan. 8, 2013 in European Application No. 12192314.8.

Office Action dated Jun. 30, 2014 in Chinese Application No. 201210488498.1.

Office Action dated Dec. 2, 2014, in Taiwanese Application No. 1032169739001.

* cited by examiner

WIRELESS POWER TRANSMITTER AND METHOD OF TRANSMITTING POWER THEREOF

CROSS-REFERENCE TO RELATED APPLICATION

This application claims the benefit under 35 U.S.C. §119 of Korean Patent Application No. 10-2011-0124419, filed Nov. 25, 2011, which is hereby incorporated by reference in its entirety.

BACKGROUND

The disclosure relates to a wireless power transmitter and a method of transmitting power thereof.

A wireless power transmission or a wireless energy transfer refers to a technology of wirelessly transferring electric energy to desired devices. In the 1800's, an electric motor or a transformer employing the principle of electromagnetic induction has been extensively used and then a method of transmitting electrical energy by irradiating electromagnetic waves, such as radio waves or lasers, has been suggested. Actually, electrical toothbrushes or electrical razors, which are frequently used in daily life, are charged based on the principle of electromagnetic induction. Until now, the long-distance transmission using the magnetic induction, the resonance and the short-wavelength radio frequency has been used as the wireless energy transfer scheme.

Recently, among the wireless power transmission technologies, an energy transfer scheme using resonance has been extensively used.

Since a wireless power transmission system based on resonance transmits electrical signals formed at transmitter and receiver sides through a coil in wireless, a user can easily charge an electronic device such as a portable device with electricity.

However, according to a current wireless charging technology, only a single portable receiver is charged by using a single source, and the distance between power transmission and reception sides is very restricted.

Particularly, in order to wirelessly charge multiple appliances with power, the area of the resonant coil may be increased (Korean Unexamined Patent Publication No. 10-2010-0026075). In this case, an undesirable magnetic field is generated even in a region without the wireless power receiver, so that the very low power transmission efficiency is represented, and the intensity of harmful electromagnetic field leaking to the outside is increased, so that problems may be occur in terms of the harmfulness to the human body.

BRIEF SUMMARY

The disclosure provides a wireless power transmitter capable of increasing the power transmission efficiency by selectively operating at least one resonant coil and capable of minimizing the irradiation amount of the harmful magnetic field, and a method of transmitting power thereof.

The disclosure provides a method of effectively transmitting power by matching with the resonance frequency of the wireless power receiver even if the resonance frequency is changed by the resonant coil selectively operated.

According to the embodiment, there is provided a wireless power transmitter to wirelessly transmit power to a wireless power receiver. The wireless power transmitter includes a transmission coil to receive power from a power supply apparatus, and a transmission resonance unit to transmit the power received therein from the transmission coil to the wireless power receiver using resonance. The transmission resonance unit includes an inner loop, and an outer loop connected to the inner loop while surrounding the inner loop.

According to the embodiment, there is provided a method of transmitting power of a wireless power transmitter that wirelessly transmits power to a wireless power receiver. The method includes detecting an approaching state of the wireless power receiver, operating a resonant coil corresponding to a region, in which the wireless power receiver is detected, among a plurality of resonant coils according to a detection result, and transmitting the power to the wireless power receiver using resonance by the resonant coil corresponding to the region in which the wireless power receiver is detected.

A program for performing the method of transmitting power of the wireless power transmitter may be recorded in a recording medium.

As described above, the embodiment has following effects.

First, the power transmission efficiency can be increased by selectively operating only a resonant coil of a region in which the wireless power receiver is provided and the irradiation amount of the harmful magnetic field can be reduced.

Second, the resonance frequency can be constantly maintained by inserting a variable inductor and a variable capacitor, so that the power transmission efficiency can be increased.

Meanwhile, other various effects may be directly or indirectly disclosed in the following description of the embodiment of the disclosure.

DETAILED DESCRIPTION

Hereinafter, embodiments will be described in detail with reference to accompanying drawings so that those skilled in the art can easily work with the embodiments. However, the embodiments may not be limited to those described below, but have various modifications.

Figure 1:
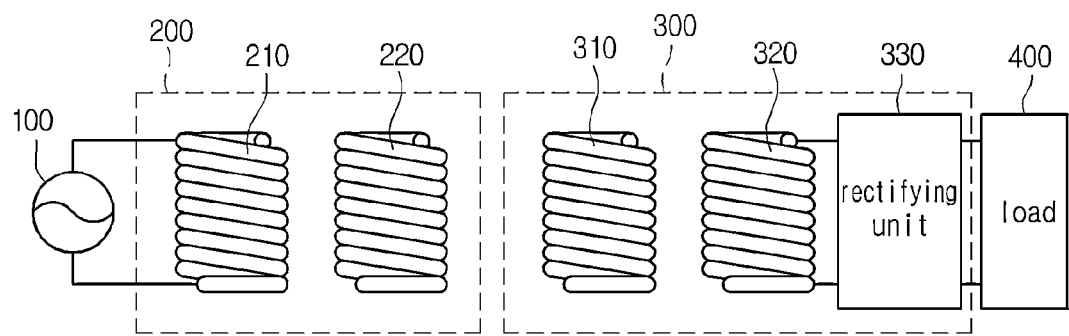
FIG. 1 is a view showing a wireless power transmission system according to one embodiment.

FIG. 1 is a view showing a wireless power transmission system according to the embodiment.

Referring to FIG. 1, the wireless power transmission system includes a power supply apparatus 100, a wireless power transmitter 200, a wireless power receiver 300, and a load 400.

The power supply apparatus 100 according to one embodiment may constitute the wireless power transmitter 200.

The wireless power transmitter 200 may include a transmission induction coil 210 and a transmission resonant coil 220.

The wireless power receiver 300 may includes a reception resonant coil 310, a reception induction coil 320, and a rectifying unit 330.

The power supply apparatus 100 has both terminals connected to both terminals of the transmission induction coil 210.

The transmission resonant coil 220 may be spaced apart from the transmission induction coil 210 by a predetermined interval.

The reception resonant coil 310 may be spaced apart from the reception induction coil 320 by a predetermined interval.

Both terminals of the reception induction coil 320 are connected to both terminals of the rectifying unit 330, and the load 400 is connected to both terminals of the rectifying unit 330. According to one embodiment, the load 400 may be included in the wireless power receiver 300.

The power generated from the power supply apparatus 100 is transmitted to the wireless power transmitter 200. The power received in the wireless power transmitter 200 is transmitted to the wireless power receiver 300 that makes resonance with the wireless power transmitter 200 due to a resonance phenomenon, that is, has the resonance frequency the same as that of the wireless power transmitter 200.

Hereinafter, the power transmission process will be described in more detail.

The power supply apparatus 100 generates AC power having a predetermined frequency and transmits the AC power to the wireless power transmitter 200.

The transmission induction coil 210 and the transmission resonant coil 220 are inductively coupled with each other. In other words, if AC current flows through the transmission induction coil 210 due to the power received from the power supply apparatus 100, the AC current is induced to the transmission resonant coil 220 physically spaced apart from the transmission induction coil 210 through the electromagnetic induction.

Thereafter, the power received in the transmission resonant coil 220 is transmitted to the wireless power receiver 300, which makes a resonance circuit with the wireless power transmitter 200, using resonance.

Power can be transmitted between two LC circuits, which are impedance-matched with each other, using resonance. The power transmitted using the resonance can be farther transmitted with higher efficiency when comparing with the power transmitted by the electromagnetic induction.

The reception resonant coil 310 receives power from the transmission resonant coil 220 using the resonance. The AC current flows through the reception resonant coil 310 due to the received power. The power received in the reception resonant coil 310 is transmitted to the reception induction coil 320, which is inductively coupled with the reception resonant coil 310, through the electromagnetic induction. The power received in the reception induction coil 320 is rectified by the rectifying unit 330 and transmitted to the load 400.

According to one embodiment, the transmission induction coil 210, the transmission resonant coil 220, the reception resonant coil 310, and the reception induction coil 320 may have a circular shape, an oval shape, and a rectangular shape, but the embodiment is not limited thereto.

The transmission resonant coil 220 of the wireless power transmitter 200 may transmit power to the reception resonant coil 310 of the wireless power receiver 300 through the magnetic field.

In detail, the transmission resonant coil 220 is resonance-coupled with the reception resonant coil 310 so that the transmission and reception resonant coils 220 and 310 operate at the resonance frequency.

The resonance-coupling between the transmission resonant coil 220 and the reception resonant coil 310 can significantly improve the power transmission efficiency between the wireless power transmitter 200 and the wireless power receiver 300.

A quality factor and a coupling coefficient are important in the wireless power transmission. In other words, the power transmission efficiency can be gradually improved as the values of the quality factor and the coupling coefficient are increased.

The quality factor may refer to an index of energy that may be stored in the vicinity of a wireless power transmitter 200 or a wireless power receiver 300.

The quality factor may vary according to the operating frequency w as well as a shape, a dimension and a material of a coil. The quality factor may be expressed as an equation, $Q=w*L/R$. In the above equation, L refers to the inductance of a coil and R refers to resistance corresponding to the quantity of power loss caused in the coil.

The quality factor may have a value of 0 to infinity. The power transmission efficiency between the wireless power transmitter 200 and the wireless power receiver 300 can be improved as the value of the quality factor is increased.

The coupling coefficient represents the degree of inductive magnetic coupling between a transmission coil and a reception coil, and has a value of 0 to 1.

The coupling coefficient may be varied according to the relative position and the distance between the transmission coil and the reception coil.

Figure 2:
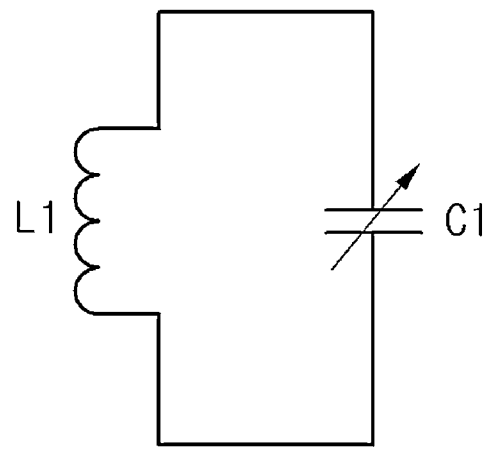
FIG. 2 is a circuit diagram showing an equivalent circuit of a transmission induction coil according to one embodiment.

FIG. 2 is a circuit diagram showing an equivalent circuit of the transmission induction coil 210 according to the one embodiment.

As shown in FIG. 2, the transmission induction coil 210 may include an inductor L1 and a capacitor C1, and a circuit having a desirable inductance and a desirable capacitance can be constructed by the inductor L1 and the capacitor C1.

The transmission induction coil 210 may be constructed as an equivalent circuit in which both terminals of the inductor L1 are connected to both terminals of the capacitor C1. In other words, the transmission induction coil 210 may be constructed as an equivalent circuit in which the inductor L1 is connected to the capacitor C1 in parallel.

The capacitor C1 may be a variable capacitor, and impedance matching may be performed by adjusting the capacitance of the capacitor C1. The equivalent circuit of the transmission resonant coil 220, the reception resonant coil 310 and the reception induction coil 320 may be the same as the equivalent circuit shown in FIG. 2.

Figure 3:
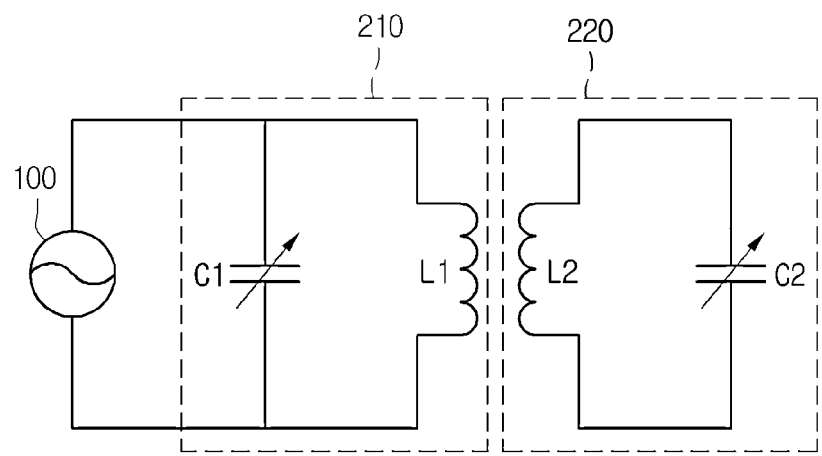
FIG. 3 is a circuit diagram showing an equivalent circuit of a power supply apparatus and a transmitter according to one embodiment.

FIG. 3 is a circuit diagram showing an equivalent circuit of the power supply apparatus 100 and the wireless power transmitter 200 according to one embodiment.

As shown in FIG. 3, the transmission induction coil 210 and the transmission resonant coil 220 may be constructed by using inductors L1 and L2 and capacitors C1 and C2 having predetermined inductances and capacitances, respectively.

Figure 4:
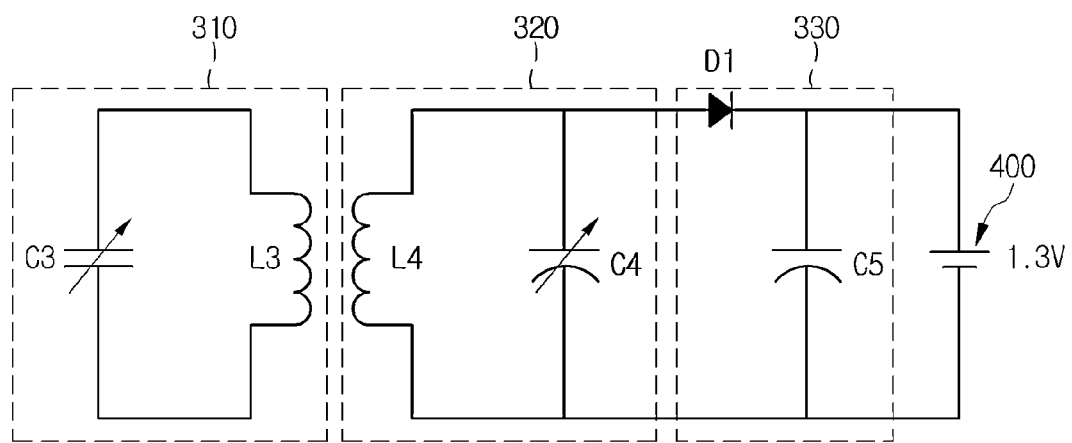
FIG. 4 is a circuit diagram showing an equivalent circuit of a reception resonant coil, a reception induction coil, a rectifier and a load according to one embodiment.

FIG. 4 is a circuit diagram showing an equivalent circuit of the wireless power receiver 300 according to one embodiment.

As shown in FIG. 4, the reception resonant coil 310 and the reception induction coil 320 may be constructed by using inductors L3 and L4, and capacitors C3 and C4 having predetermined inductances and capacitances, respectively.

The rectifying unit 330 may convert AC power received from the reception induction coil 320 into DC power to transfer the DC power to the load 400.

In detail, the rectifying unit 330 may include a rectifier and a smoothing circuit. According to one embodiment, the rectifier may include a silicon rectifier and may be equivalent as a diode D1 as shown in FIG. 4.

The rectifier can convert the AC power received from the reception induction coil 320 into the DC power.

The smoothing circuit can output a smooth DC power by removing AC components included in the DC power converted by the rectifier. According to one embodiment, as shown in FIG. 4, the smoothing circuit may include a rectifying capacitor C5, but the embodiment is not limited thereto.

The load 400 may be a predetermined rechargeable battery or a device requiring the DC power. For example, the load 400 may refer to a battery.

The wireless power receiver 300 may be equipped with an electronic device, such as a cellular phone, a laptop computer or a mouse, requiring the power. Accordingly, the reception resonant coil 310 and the reception induction coil 320 may have the shapes suitable for the shape of the electronic device.

The wireless power transmitter 200 may exchange information with the wireless power receiver 300 through in-band communication or an out-of-band communication.

The in-band communication refers to the communication for exchanging information between the wireless power transmitter 200 and the wireless power receiver 300 through a signal having a frequency used in the wireless power transmission. The wireless power receiver 300 may further include a switch and may receive or may not receive power transmitted from the wireless power transmitter 200 through a switching operation of the switch. Accordingly, the wireless power transmitter 200 can recognize an on-signal or an off-signal of the switch included in the wireless power receiver 300 by detecting the quantity of power consumed in the wireless power transmitter 200.

In detail, the wireless power receiver 300 may change the power consumed in the wireless power transmitter 200 by adjusting the quantity of power absorbed in a resistor by using the resistor and the switch. The wireless power transmitter 200 may acquire the state information of the wireless power receiver 300 by detecting the variation of the power consumption. The switch may be connected to the resistor in series. According to one embodiment, the state information of the wireless power receiver 300 may include information about the present charge amount in the wireless power receiver 300 and the variation of the charge amount.

In more detail, if the switch is open, the power absorbed in the resistor becomes zero, and the power consumed in the wireless power transmitter 200 is reduced.

If the switch is short-circuited, the power absorbed in the resistor becomes greater than zero, and the power consumed in the wireless power transmitter 200 is increased. If the wireless power receiver 300 repeats the above operation, the wireless power transmitter 200 detects power consumed therein to make digital communication with the wireless power receiver 300.

The wireless power transmitter 200 receives the state information of the wireless power receiver 300 through the above operation so that the wireless power transmitter 200 can transmit appropriate power.

To the contrary, the wireless power transmitter 200 may include a resistor and a switch to transmit the state information of the wireless power transmitter 200 to the wireless power receiver 300. According to one embodiment, the state information of the wireless power transmitter 200 may include information about the maximum amount of power to be supplied from the wireless power transmitter 200, the number of wireless power receivers 300 receiving the power from the wireless power transmitter 200 and the amount of available power of the wireless power transmitter 200.

Hereinafter, the out-of-band communication will be described.

The out-of-band communication refers to the communication performed through a specific frequency band other than the resonance frequency band in order to exchange information necessary for the power transmission. The wireless power transmitter 200 and the wireless power receiver 300 can be equipped with out-of-band communication modules to exchange information necessary for the power transmission. The out-of-band communication module may be installed in the power supply apparatus. In one embodiment, the out-of-band communication module may use a short-distance communication technology, such as Bluetooth, Zigbee, WLAN or NFC, but the embodiment is not limited thereto.

Figure 5:
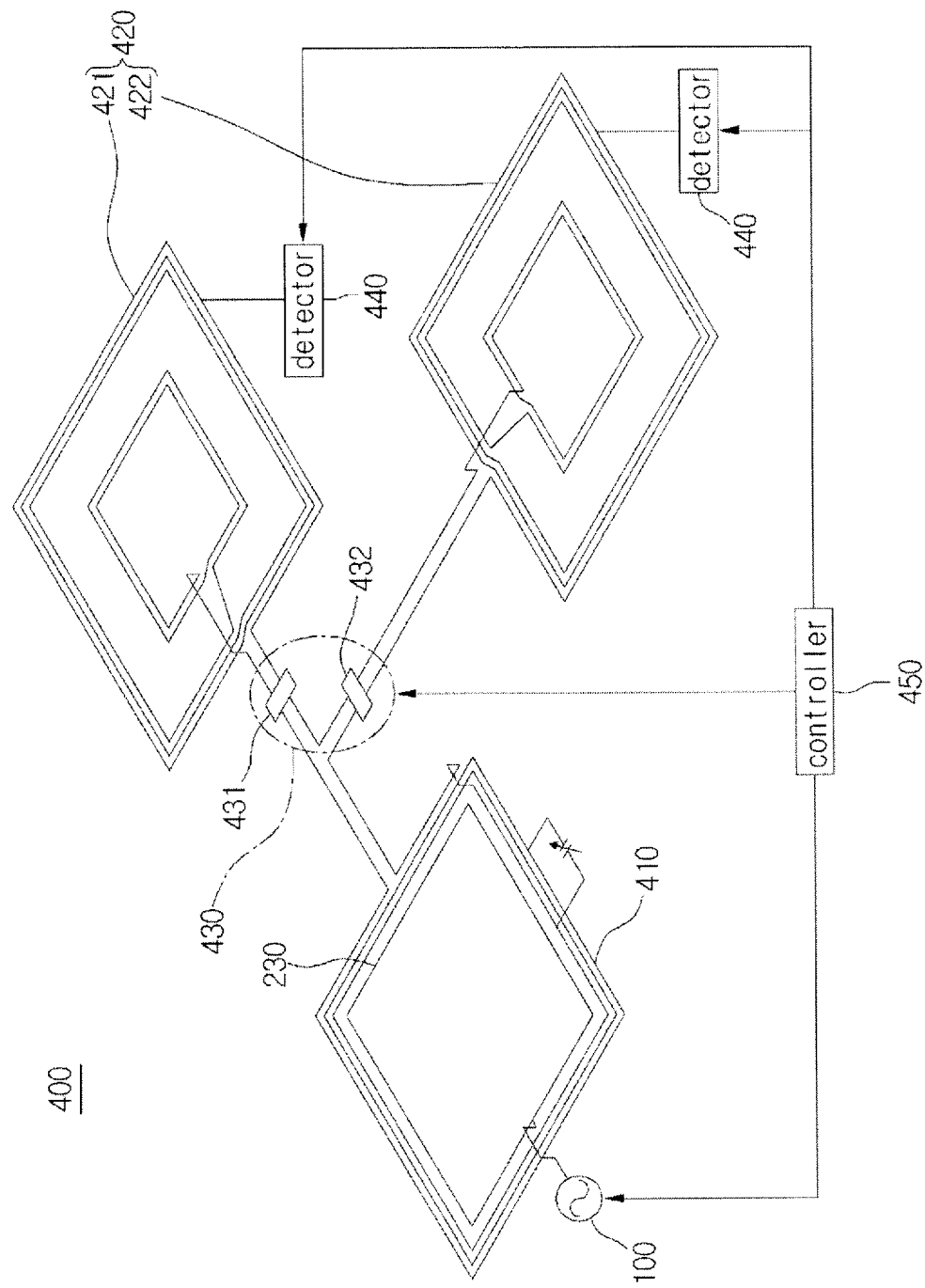
FIG. 5 is a view showing the structure of a wireless power transmitter according to one embodiment.

FIG. 5 is a view showing the structure of a wireless power transmitter 400 according to one embodiment.

Hereinafter, the wireless power transmitter 400 according to one embodiment will be described with reference to FIGS. 1 to 4

Referring to FIG. 5, the wireless power transmitter 400 may include a transmission coil 230, a distribution coil 410, a transmission resonance unit 420, a switch unit 430, a detector 440, and a controller 450.

The transmission resonance unit 420 may include at least one resonant coil.

For example, as shown in FIG. 5, the transmission resonance unit 420 may include first and second resonant coils 421 and 422.

Although FIG. 5 shows that the wireless power transmitter 400 includes two resonant coils, the embodiment is not limited thereto. In other words, the wireless power transmitter 400 may include at least two resonant coils.

Although the switch unit 430 includes two switches, the embodiment is not limited thereto. In other words, the switch unit 430 may include at least two switches. Each resonant coil may be paired with each switch.

The transmission coil 230 may receive AC power from the power supply apparatus 100.

The distribution coil 410 may receive AC power from the transmission coil 230 through electromagnetic induction, and may transmit the received power to the transmission resonance unit 420.

The distribution coil 410 may transmit power to both of the first and second resonant coils 421 and 422 of the transmission resonance unit 420 or to one of the first and second resonant coils 421 and 422. The distribution coil 410 may apply current to the first and second resonant coils 421 and 422 by using the AC power received from the transmission coil 230.

The transmission resonant unit 420 may receive power from the distribution coil 410 and transmit the received power to the wireless power receiver using resonance. The distribution coil 410 and the first and second resonant coils 421 and 422 may be realized like the equivalent circuit diagram of the transmission induction coil 210 shown in FIG. 2. According to one embodiment, the first and second resonant coils 421 and 422 may be wound at least one time to form the shape of a loop. The shape of the loop may be a polygonal shape such as a circular shape, an oval shape, or a rectangular shape, but the embodiment is not limited thereto. FIG. 5 shows the first and second resonant coils 421 and 422 having the shape of a rectangular loop. The first and second resonant coils 421 and 422 may further variable capacitors (not shown) to adjust the resonance frequencies thereof.

According to one embodiment, the distribution coil 410 and the first and second resonant coils 421 and 422 may have a multi-tap structure. According to the multi-tap structure, on the assumption that the first resonant coil 421 is wound five times in total, the outer loop of the first resonant coil 421 is spaced apart from the inner loop of the first resonant coil 421 by a predetermined interval, and the number of the winding turns of the outer loop is different from the number of the winding turns of the inner loop. As shown in FIG. 5, according to one embodiment, the outer loop of the first resonant coil 421 may be wound three times, and the inner loop of the first resonant coil 421 may be wound two times, but the embodiment is not limited thereto.

The distribution coil 410 may be connected to the first and second resonant coils 421 and 422 in series through one conductive line. In other words, the distribution coil 410 may be electrically connected to the first and second resonant coils 421 and 422 in series.

The switch unit 430 may connect the distribution coil 410 to the transmission resonance unit 420, or may disconnect the distribution coil 410 from the transmission resonance unit 420.

In detail, a first switch 431 may electrically connect the distribution coil 410 to the first resonant coil 421 or disconnect the distribution coil 410 from the first resonant coil 421 according to the driving signal of the controller 450. According to one embodiment, the switch may be a switch based on a micro-electro-mechanical system (MEMS) technology. According to the MEMS, a 3-D structure is provided on a silicon substrate through a semiconductor fabricating technology.

The detector 440 may detect the approaching state of the wireless power receive. The detector 440 may detect if the wireless power receiver is close onto the transmission resonance unit 420.

In detail, each detector 440 may be provided at one side of each of the first and second resonant coils 421 and 422 to detect the wireless power receiver provided above the first and second resonant coils 421 and 422.

According to one embodiment, the detector 440 may be a coil for detection provided at one side of each resonant coil to measure the intensity of a magnetic field formed by each resonant coil. In detail, the detectors 440 may detect the wireless power receiver 300 by measuring the intensities of the magnetic fields formed by the first and second resonant coils 421 and 422.

According to one embodiment, if the intensities of the magnetic fields formed by the first and second resonant coils 412 and 422 exceed a threshold value, the detector 440 may determine that the wireless power receiver is detected. The threshold value may represent the minimum magnetic field required to detect the wireless power receiver. For example, if the wireless power receiver is provided above the first resonant coil 412, since the power transmission may be made between the first resonant coil 412 and the wireless power receiver using resonance, the intensity of the magnetic field formed by the first resonant coil 412 may be increased. In this case, the detector 440 may measure the intensity of the magnetic field and determines detection of the wireless power receiver if the measured intensity of the magnetic field is equal to or greater than the threshold value. The detector 440 may include a magnetic sensor.

The controller 450 may control the overall operation of the wireless power transmitter 400. In particular, the controller 450 may generate a driving signal to control the switch unit 430 so that only the resonant coil corresponding to the detection region of the wireless power receiver can be selectively operated.

The switch unit 430 may electrically connect the distribution coil 410 to the transmission resonance unit 420 or electrically disconnect the distribution coil 410 from the transmission resonance unit 420 according to the driving signal. According to one embodiment, when the detector 440 detects the wireless power receiver located above the first resonant coil 421 of the transmission resonance unit 420, the controller 450 generates a driving signal to open the first switch 431 of the switch unit 430 according to the detection result, and transmits the generated driving signal to the first switch 431. Thereafter, the first switch 431 electrically connects the distribution coil 410 to the first resonant coil 421, and the distribution coil 410 transmits power to the first resonant coil 421. Therefore, the wireless power receiver may receive power from the first resonant coil 421 using resonance.

If the detector 440 detects that wireless power receivers are located above the first and second resonant coils 421 and 422, the controller 450 generates open signals to electrically connect the first switch 431 to the first resonant coil 421, and electrically connect the second switch 432 to the second resonant coil 422, so that the open signals are transmitted to the first and second switches 431 and 432. Therefore, the distribution coil 410 is electrically connected to the first and second resonant coils 421 and 422, and the first and second resonant coils 421 and 422 transmit power to wireless power receivers, respectively, using resonance.

According to one embodiment, the controller 450 sequentially transmits periodic driving signals to the first and second switches 431 and 432 in order to detect the wireless power receivers. In other words, the controller 450 generates the driving signal to open the first switch 431 so that the first switch 431 can be opened. Thereafter, the controller 450 determines that the power transmission occurs between the first resonant coil 421 and the first wireless power receiver using resonance by transmitting power to the first resonant coil 421 through the distribution coil 410.

In this case, the controller 450 may control the power supply apparatus 100 to transmit micro-power to the first resonant coil 421. If power transmission is made between the first resonant coil 421 and the first wireless power receiver, the controller 450 may determine the power transmission and control the power supply apparatus 100 so that the power supply apparatus 100 increases the quantity of power to be transmitted to the first resonant coil 421. If the power transmission is not made between the first resonant coil 421 and the first wireless power receiver, the controller 450 determines that the power transmission is not made between the first resonant coil 421 and the first wireless power receiver and generates the driving signal to open the second switch 432 so that the second switch 432 is opened. According to one embodiment, if the power transmission is not made between the first resonant coil 421 and the first wireless power receiver, the first wireless power receiver may not be detected. In addition, according to one embodiment, if the power transmission is not made between the first resonant coil 421 and the first wireless power receiver, the battery of the first wireless power receiver may be charged beyond a predetermined value.

Thereafter, the controller 450 determines if the power transmission is made between the second resonant coil 422 and the second wireless power receiver. If the controller 450 confirms that the power transmission is made between the second resonant coil 422 and the second wireless power receiver, the controller 450 may control the power supply apparatus 100 so that the quantity of power to be transmitted from the second resonant coil 422 to the second wireless power receiver is increased.

As described above, the power transmission efficiency can be improved by selectively operating only the resonant coil in the region of the wireless power receiver. In addition, if all resonant coils are operated, the irradiation amount of the magnetic field harmful to the human body can be reduced.

Figure 6:
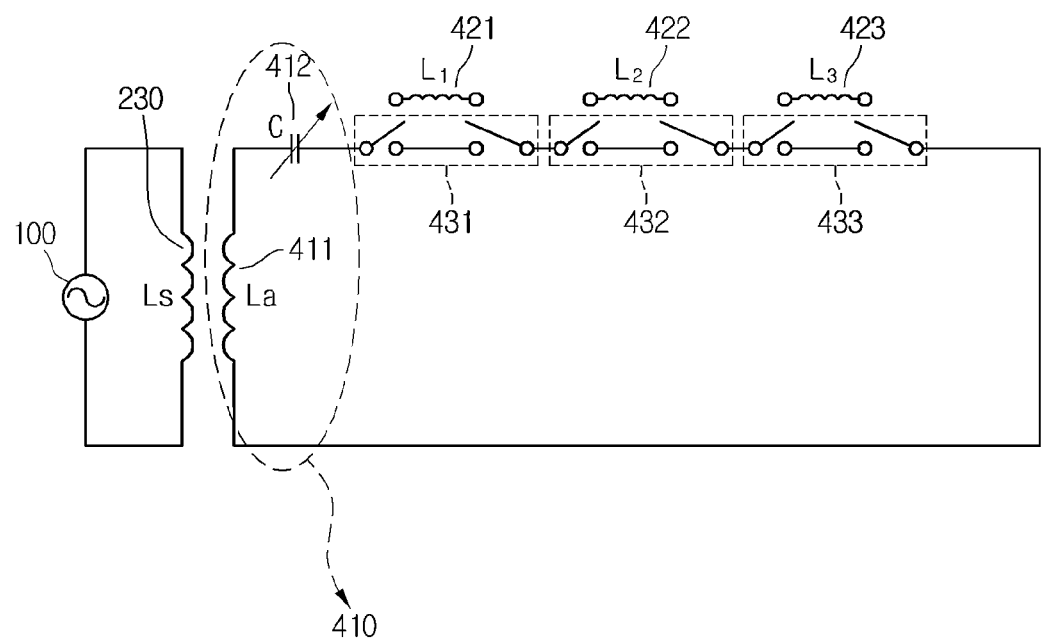
FIG. 6 is a circuit diagram showing the wireless power transmitter according to one embodiment.

FIG. 6 is a circuit diagram showing the wireless power transmitter 400 according to one embodiment.

FIG. 6 is a circuit diagram showing the equivalent circuit of the wireless power transmitter 400 shown in FIG. 5. The transmission coil 230 shown in FIG. 6 is not depicted in FIG. 5. Both terminals of the transmission coil 230 are connected to opposite terminals of the power supply apparatus 100. The transmission coil 230 may receive power from the power supply apparatus 100, and may transmit the received AC power to the distribution coil 410 through the electromagnetic induction.

The distribution coil 410 may transmit the AC power, which is received therein from the transmission coil 230, to the transmission resonance unit 420.

In particular, the distribution coil 410 may distribute the AC power, which is received from the transmission coil 230, to at least one of the first to third resonant coils 421 to 423.

The distribution coil 410 may include an inductor 411 and a capacitor 412. The inductor 411 may include a fixed inductor or a variable inductor, and the capacitor 412 may include a variable capacitor.

The resonance frequency of the wireless power transmitter 400 may be adjusted by the inductance of the inductor 411 and the capacitance of the capacitor 412.

The first to third resonant coils 421 to 423 correspond to the first to third switches 431 to 433, respectively, so that the first to third resonant coils 421 to 423 may be electrically connected to each other or may be electrically disconnected from each other. The inductor 411 and the capacitor 412 are connected to each other in series, and connected to the switches 431 to 433 in series. According to one embodiment, the inductor 411 may be fabricated through a micro-electro-mechanical system (MEMS) technology. If at least one of the first to third wireless power receivers is detected above the first to third resonant coils 431 to 433, the resonance frequency may be varied according to the number of resonant coils that simultaneously operate. In this case, even if the resonance frequency is changed, the inductor 411 and the capacitor 412 can constantly maintain the resonance frequency so that the power transmission through the resonant can be smoothly maintained. Since the range of the capacitance of the capacitor 412 is limited, the inductance can be adjusted by connecting the inductor 411 to the capacitor 412 in series, so that the resonance frequency can be adjusted. In other words, even if a plurality of resonant coils are connected to each other to change the inductance, the resonance frequency can be constantly maintained through the capacitor 412 and the inductor 411. The controller 450 can adjust the resonance frequency by changing the capacitance of the capacitor 412 and the inductance of the inductor 411.

The following equation shows that the resonance frequency of the wireless power transmitter 400 is constantly maintained. On the assumption that the number of inductors corresponding to the resonant coils is m, the inductance values of the inductors have values of L1 to Lm, the inductance of the inductor 411 of the distribution coil 410 is La, and the capacitance of the capacitor 412 is C, if all inductors are connected to each other in series, the resonance frequency w may be expressed by following Equation 1.

$$W=1/\sqrt{(La+L1+L2+L3+...+Lm)C} \quad \text{Equation 1}$$

As shown in Equation 1, the total inductance values may be varied according to the connection state (connection number) of the resonant coils, so that the resonance frequency w of the wireless power transmitter 400 may be varied. If the resonance frequency w is varied according to the connection or the disconnection of the resonant coils, the power transmission through the resonance may not be smoothly performed. Therefore, the controller 450 changes the inductance La and the capacitance C through the inductor 411 and the capacitor 412 to constantly maintain the resonance frequency so that the resonance frequency w is not affected by the connection or the disconnection of the resonant coils.

Although the embodiment has been described in that both of the inductor 411 and the capacitor 412 are connected to the resonant coils in series, only one of the inductor 411 and the capacitor 412 may be connected to the resonant coils in series.

In addition, each resonant coil may further include an additional capacitor, and the resonance frequency may be adjusted by the capacitor included in the resonant coil.

Since the resonance frequency can be constantly maintained by inserting the inductor 411 and the capacitor 412 into the wireless power transmitter 400 as described above, the problem related to the power transmission efficiency caused according to the variation of the resonance frequency can be solved.

Figure 7:
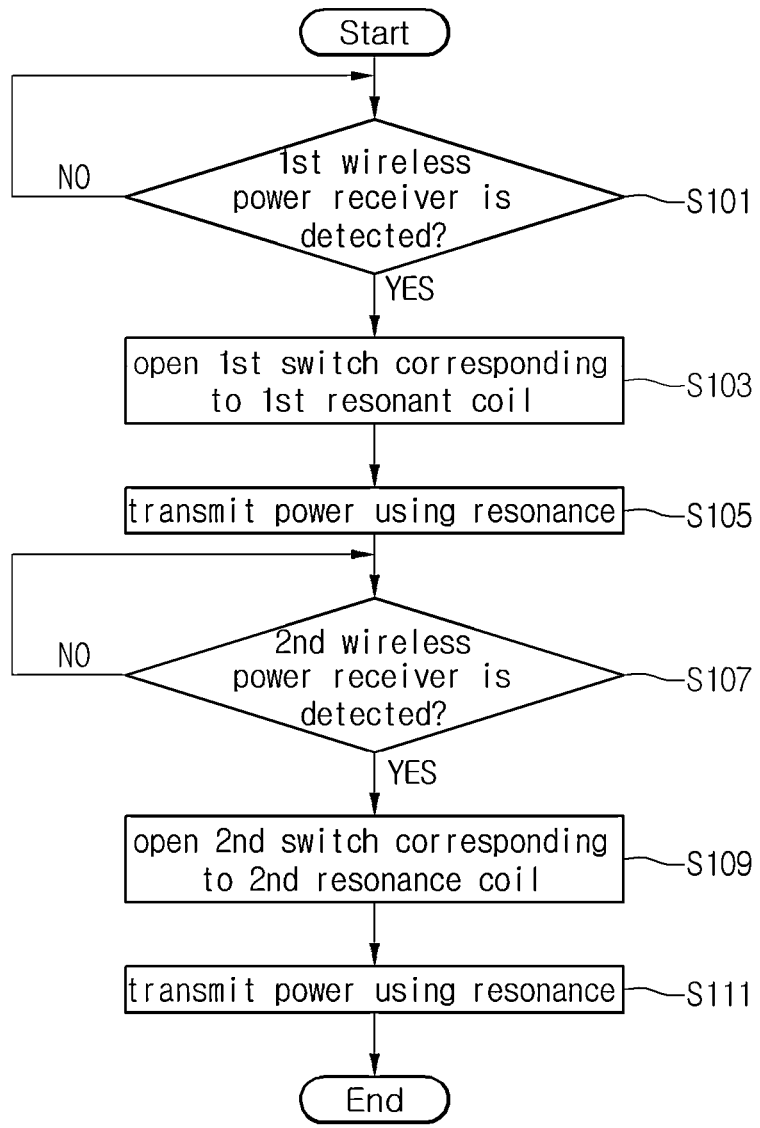
FIG. 7 is a flowchart showing a method of wirelessly transmitting power by using the wireless power transmitter according to one embodiment.

FIG. 7 is a flowchart showing the method of wirelessly transmitting power through the wireless power transmitter 400 according to one embodiment.

First, the detector 440 determines if a first wireless power receiver is detected in a first region (step S101). The detector 440 may include a coil for detection. The coil for the detection may be located on one surface of each resonant coil. In this case, the first region may refer to the range in which the first resonant coil 421 can detect the reception resonant coil provided in the first wireless power receiver. According to one embodiment, the first region may be varied according to the number of the turns of the first resonant coil 421, and the diameter of the first resonant coil 421.

If the first wireless power receiver is detected, the controller 450 opens the first switch 431 paired with the first resonant coil 421 (step S103). When the first switch 431 is opened, the first resonant coil 421 is connected to the distribution coil 410 as shown in FIG. 6. If the first switch 431 is opened, the distribution coil 410 transmits power to the first resonant coil 421, and the first resonant coil 421 transmits power to the first wireless power receiver through the resonance (step S105).

Thereafter, the detector 440 determines if the second wireless power receiver is detected in the second region (step S107). In this case, the second region may refer to the range in which the second resonant coil 422 can detect the reception resonant coil provided in the second wireless power receiver. According to one embodiment, the second region may be varied according to the number of turns of the second resonant coil 422, and the diameter of the second resonant coil 422.

If the second wireless power receiver is detected, the controller 450 opens the second switch 432 paired with the second resonant coil 422 (step S109). When the second switch 432 is opened, the second resonant coil 422 is connected to the distribution coil 410 as shown in FIG. 6. If the second switch 432 is opened, the distribution coil 410 transmits power to the first resonant coil 421, and the second resonant coil 422 transmits power to the second wireless power receiver through the resonance (step S111).

As described above, according to the method of wirelessly transmitting power of the embodiment, only the resonant coil corresponding to the detected wireless power receiver is selectively operated, thereby inhibiting the power from being wasted in a resonant coil located in the region without a wireless power receiver. In addition, the irradiation amount of the magnetic field exposed to the outside to exert a harmful influence on the human body can be reduced.

Figure 8:
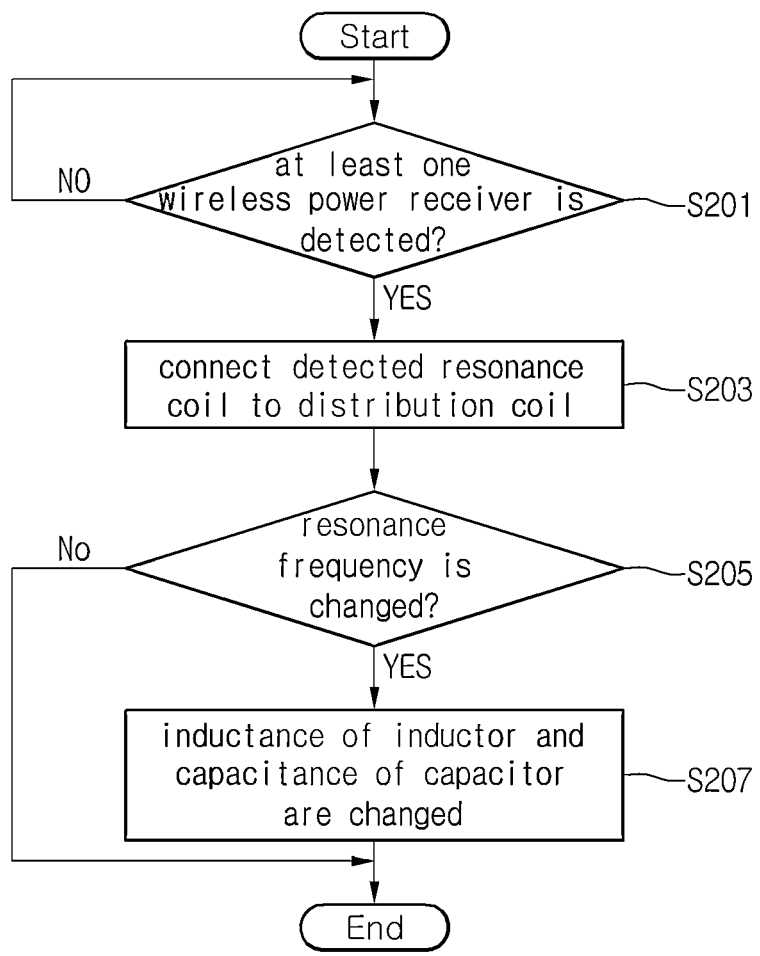
FIG. 8 is a flowchart showing a method of adjusting the resonance frequency according to one embodiment.

FIG. 8 is a flowchart showing a method of adjusting the resonance frequency according to one embodiment.

First, the controller 450 determines if at least one wireless power receiver is detected (step S201). In order to detect the wireless power receiver, a coil for detection may be installed at one surface of each resonant coil. The details thereof have been described with reference to FIGS. 5 and 6.

If the wireless power receiver is detected, the controller 450 connects a switch, which is paired with the resonant coil corresponding to the detected wireless power receiver, to the distribution coil 410 in series (step S203). If only two wireless power receivers are detected, the controller 450 connects only the two resonant coils corresponding to the detected regions.

Thereafter, the controller 450 determines if the resonance frequency of the wireless power transmitter 400 is changed (step S205). In other words, the inductance of the wireless power transmitter 400 may be changed by resonant coils connected to each other in series, so that the resonance frequency of the wireless power transmitter 400 can be changed.

If the controller 450 determines that the resonance frequency of the wireless power transmitter 400 is changed, the controller 450 changes the inductance of the inductor 411 and/or the capacitance of the capacitor 412 (step S207). The controller 450 changes the inductance of the inductor 411 and the capacitance of the capacitor 412 so that the resonance frequency of the wireless power transmitter 400 is matched with the resonance frequency of the wireless power receiver. In this case, the wireless power transmitter 400 may previously have information of the resonance frequency of the wireless power receiver.

As described above, according to the method of adjusting the resonance frequency of the wireless power transmitter of one embodiment, since the resonance frequency can be constantly maintained by inserting the inductor 411 and the capacitor 412 into the wireless power transmitter 400 as described above, the problem related to the power transmission efficiency caused according to the variation of the resonance frequency can be solved.

Figure 9:
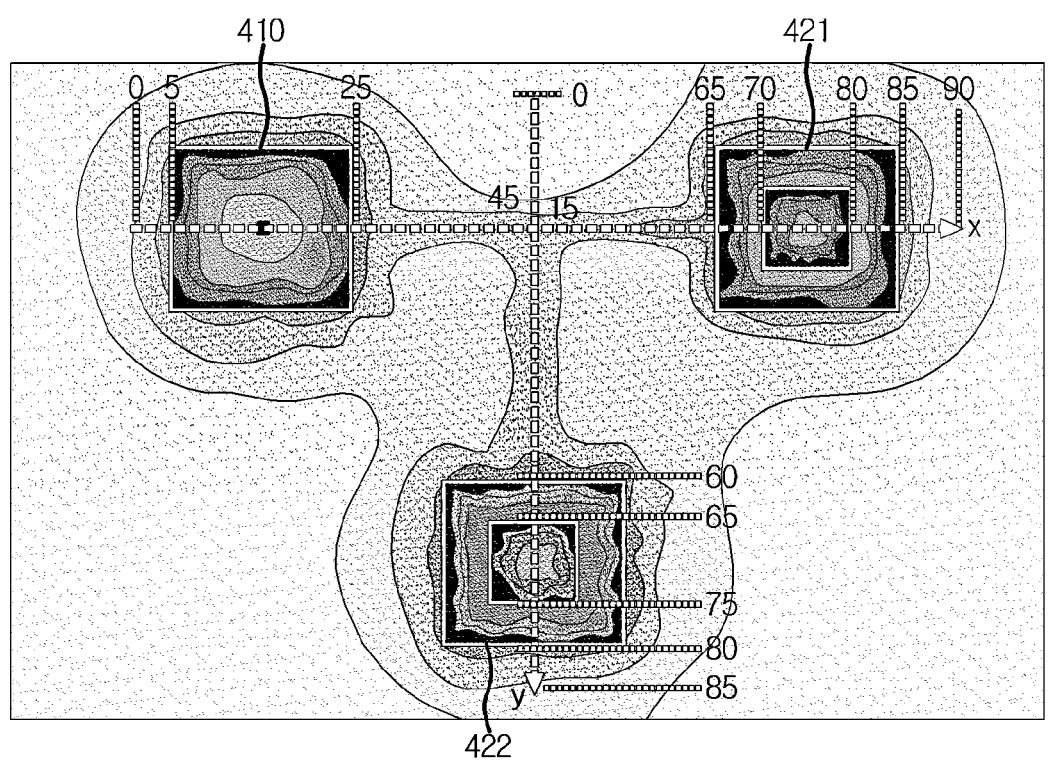
FIG. 9 is a view showing the result of a simulation in which the intensity of the magnetic field is detected by using a wireless power transmitter including loop-type resonant coils according to one embodiment.

FIG. 9 is a view showing the result of a simulation of detecting the intensity of a magnetic field when employing the wireless power transmitter 400 including loop-shape resonant coils according to one embodiment.

FIG. 9 shows the result of the simulation in which the intensity of the magnetic field is detected by using "HFSS" of ANSYS Inc., which is an electromagnetic wave analysis tool, and measured at the distance of 10 cm from the ground surface.

In FIG. 9, an x axis represents a longitudinal direction of the section of the wireless power transmitter 400, a y axis represents a transverse direction of the section of the wireless power transmitter 400, and a z axis represents a direction perpendicular to the section of the wireless power transmitter 400.

According to the simulation result, magnetic fields are induced only in the vicinity of the first and second resonant coils 421 and 422.

In other words, when the wireless power transmitter 400 performs power transmission through the first and second resonant coils 421 and 422, the magnetic field may be concentrated in the vicinity of the first and second resonant coils 421 and 422. In this case, when the wireless power receiver is located above the first resonant coil 421 or the second resonant coil 422, the wireless power transmitter 400 can effectively power to the wireless power receiver.

Figure 10:
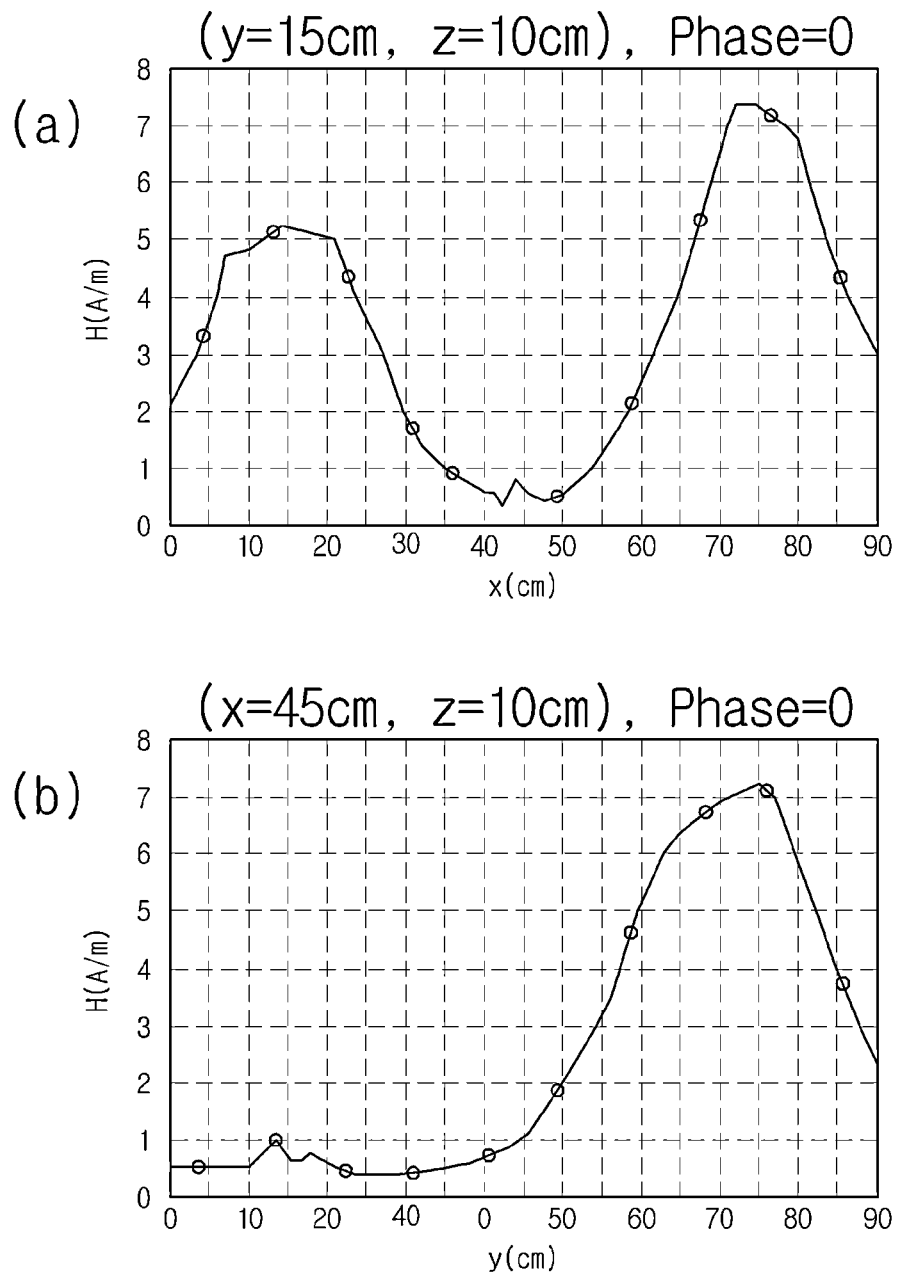
FIG. 10 is a graph showing the intensity of the magnetic field in the section of the wireless power transmitter shown in FIG. 9.

FIG. 10 is a graph showing the intensity of a magnetic field in the section of the wireless power transmitter 400 shown in FIG. 9.

FIG. 10($a$) is a graph showing the intensities (unit; H(A/m)) of the magnetic field according to distances of an x axis at a position which is distanced by 15 cm and 10 cm along y and z axes from an original point.

As shown in FIG. 10($a$), the intensity of the magnetic field at a region (substantially distanced by 65 cm to 80 cm from the x axis) of the first resonant coil 421 is greater than the intensity of the magnetic field at the region without the first resonant coil 421. In particular, the intensity of the magnetic field at the region (distanced by 70 cm to 80 cm from the x axis) in which the inner loop of the first resonant coil 421 having a multi-tap structure is located has a value exceeding 7 H, so that the power transmission efficiency can be greatly improved when the wireless power receiver is located in the inner loop of the first resonant coil 421.

FIG. 10($b$) is a graph showing intensities (unit; H(A/m)) of the magnetic field according to distances of an y axis at a position which is distanced by 45 cm and 10 cm in x and z axes, respectively, from an original point.

As shown in FIG. 10($b$), the intensity of the magnetic field at a region (substantially distanced by 65 cm to 80 cm from the x axis) of the second resonant coil 422 is greater than the intensity of the magnetic field at the region without the second resonant coil 422. In particular, the intensity of the magnetic field at the region (distanced by 50 cm to 60 cm from the y axis), in which the inner loop of the second resonant coil 422 having a multi-tap structure is located, has a value of about 7 H, so that the power transmission efficiency can be greatly improved when the wireless power receiver is located in the inner loop of the second resonant coil 422.

The method of adjusting the resonance frequency of the wireless power transmitter according to one embodiment can be prepared as the form of a program executable in a computer and stored in computer-readable recording media. The computer-readable recording media include an ROM, an RAM, a CD-ROM, a magnetic tape, a floppy disc, and an optical data storing device. In addition, the computer-readable recording media may be realized in the form of a carrier wave such as transmission over the Internet.

In addition, the computer-readable recording media are distributed into computer systems connected to each other over a network to store and execute codes readable by the computer through a distribution scheme. In addition, the functional programs, codes, and code segments for realizing the method can be easily deduced by programmers in the art to which the disclosure pertains.

Although a preferred embodiment of the disclosure has been described for illustrative purposes, those skilled in the art will appreciate that various modifications, additions and substitutions are possible, without departing from the scope and spirit of the invention as disclosed in the accompanying claims.

What is claimed is:

1. A wireless power transmitter to wirelessly transmit power to a wireless power receiver, the wireless power transmitter comprising:
 a transmission resonance unit to transmit the power to the wireless power receiver using resonance,
 wherein the transmission resonance unit comprises a plurality of resonant coils,
 wherein the plurality of resonant coils comprises:
  an inner loop and
  an outer loop connected to the inner loop while surrounding the inner loop;
 a switch unit configured to select at least one of the plurality of resonant coils corresponding to a region in which the wireless power receiver is detected; and
 an inductor and a capacitor configured to constantly maintain a resonance frequency of the selected resonant coil for power transmission to the wireless power receiver.

2. The wireless power transmitter of claim 1, wherein the inner loop and the outer loop are formed by winding one conductive line at least one time, and a number of winding turns of the inner loop is equal to or different from a number of winding turns of the outer loop.

3. The wireless power transmitter of claim 1, wherein the inner loop and the outer loop have one of a circular shape, a rectangular shape, and an oval shape.

4. The wireless power transmitter of claim 1, further comprising a distribution coil to transmit the power to the resonant coil corresponding to the region, in which the wireless power receiver is detected, among the resonant coils.

5. The wireless power transmitter of claim 4, wherein the switch unit comprises a plurality of switches, and each switch is paired with each resonant coil to connect the resonant coil corresponding to the region, in which the wireless power receiver is detected, to the distribution coil.

6. The wireless power transmitter of claim 1, wherein the capacitor includes a variable capacitor to constantly maintain the resonance frequency of the selected resonant coil for power transmission to the wireless power receiver.

7. The wireless power transmitter of claim 5, wherein the resonant coil corresponding to the region, in which the wireless power receiver is detected, among the resonant coils is connected to the distribution coil in series.

8. The wireless power transmitter of claim 1, further comprising a detector to detect an approaching state of the wireless power receiver.

9. The wireless power transmitter of claim 8, wherein the detector comprises a detection coil to detect intensity of a magnetic field formed in each resonant coil.

10. The wireless power transmitter of claim 5, wherein each switch is a micro-electro-mechanical system switch.

11. A method of transmitting power of a wireless power transmitter that wirelessly transmits power to a wireless power receiver, the method comprising:
 detecting an approaching state of the wireless power receiver;
 selecting at least one of a plurality of resonant coil corresponding to a region, in which the wireless power receiver is detected, according to a detection result;
 determining a change state of a resonance frequency of the selected resonant coil according to the selection of the resonant coil corresponding to the region in which the wireless power receiver is detected; and
 matching the resonance frequency of the selected resonant coil with a resonance frequency of a resonant coil of the wireless power receiver, if the resonance frequency of the selected resonant coil is changed; and
 transmitting the power to the wireless power receiver using resonance through the matched resonance frequency by the resonant coil corresponding to the region in which the wireless power receiver is detected.

12. The method of claim 11, further comprising:
 checking the changed resonance frequency and
 changing the checked resonance frequency to the resonance frequency of the wireless power receiver using an inductor and a capacitor.

13. A recording medium having a program to execute a method of transmitting power of a wireless power transmitter claimed according to claim 10.

14. A recording medium having a program to execute a method of transmitting power of a wireless power transmitter claimed according to claim 11.

15. A recording medium having a program to execute a method of transmitting power of a wireless power transmitter claimed according to claim 12.

16. The wireless power transmitter of claim 1, wherein the inductor includes a variable inductor to constantly maintain the resonance frequency of the selected resonant coil for power transmission to the wireless power receiver.

* * * * *